(12) United States Patent
Matthews et al.

(10) Patent No.: US 6,379,733 B2
(45) Date of Patent: Apr. 30, 2002

(54) METHOD AND APPARATUS FOR MAKING AN HELICAL FOOD PRODUCT

(75) Inventors: Bernard Trevor Matthews, Norwich; David John Joll, Corpusty; Peter Elwyn Roberts; David Norman Wilson, both of Norwich; John Harry Barker, Sheringham, all of (GB)

(73) Assignee: Bernard Matthews, PLC, Norfolk (GB)

( * ) Notice: Subject to any disclaimer, the term of this patent is extended or adjusted under 35 U.S.C. 154(b) by 0 days.

(21) Appl. No.: 09/772,422

(22) Filed: Jan. 30, 2001

Related U.S. Application Data (62) Division of application No. 09/075,284, filed on May 8, 1998.

(30) Foreign Application Priority Data

May 9, 1997 (GB) .............................................. 9709460

(51) Int. Cl.[7] .............................. B29C 47/24; A23P 1/12
(52) U.S. Cl. .................. 426/516; 426/517; 426/92; 426/140; 426/282; 426/249; 426/646; 426/652; 426/513; 425/97; 425/382.3
(58) Field of Search ................................ 426/652, 646, 426/615, 637, 277, 513, 516, 517, 249, 104, 138, 140, 282, 283, 284, 92; 425/133.1, 382.2, 463, 97

(56) References Cited

U.S. PATENT DOCUMENTS

| | | |
|---|---|---|
| 1,628,251 A | 5/1927 | Laskey |
| 1,714,234 A | 5/1929 | Ost |
| 2,786,764 A | 3/1957 | Rivoche |
| 3,180,737 A | 4/1965 | Culp ........................... 99/104 |
| 3,204,844 A | 9/1965 | Wallace et al. |
| 3,511,669 A | 5/1970 | Swartz et al. |
| 3,607,860 A | 9/1971 | Yamoto et al. |
| 3,615,686 A | 10/1971 | Marshall ....................... 99/100 |
| 3,711,291 A | 1/1973 | Leidy et al. |
| 3,876,743 A | 4/1975 | Soderlund et al. |
| 3,917,876 A | 11/1975 | Harwood et al. |
| 3,969,539 A | 7/1976 | Sumner et al. |
| 3,982,003 A | 9/1976 | Mitchell et al. ............. 426/577 |
| 4,018,935 A | 4/1977 | Catlin et al. ................. 426/646 |
| 4,025,260 A | 5/1977 | Neel |
| 4,073,962 A | 2/1978 | Spata et al. |
| 4,207,347 A | 6/1980 | D'Atri et al. |
| 4,332,823 A | 6/1982 | Buemi et al. |
| 4,387,111 A | 6/1983 | Mullender ................... 426/615 |
| 4,410,554 A | 10/1983 | Sailer |
| 4,504,511 A | 3/1985 | Binley |
| 4,755,393 A | 7/1988 | Toba et al. |
| 4,778,686 A | 10/1988 | Chauvin ...................... 426/412 |
| 4,803,091 A | 2/1989 | Mottur et al. |
| 4,834,999 A | 5/1989 | Matthews et al. ........... 426/413 |

(List continued on next page.)

FOREIGN PATENT DOCUMENTS

| | | |
|---|---|---|
| EP | 0288120 | 10/1988 |
| EP | 0876896 A1 | 11/1998 |
| GB | 2 156 727 A | 10/1985 |
| HU | 72455 | 4/1996 |
| WO | WO098/51471 | 11/1998 |

*Primary Examiner*—Cynthia L. Nessler
(74) *Attorney, Agent, or Firm*—Ratner & Prestia (57) ABSTRACT

A method is provided for making a helical food product. The method includes the step of extruding one or more plastic food substrates through a nozzle into a hollow shaped part. Relative rotation of the nozzle and the shaping part is caused, thereby forming a product of helical configuration. A fluid barrier agent is applied to the outer surface of the product as it is dispensed from the nozzle into the shaping part, which barrier agent is adapted to prevent reannealing of adjacent turns of the helical product.

2 Claims, 5 Drawing Sheets

U.S. PATENT DOCUMENTS

| | | | |
|---|---|---|---|
| 4,874,623 A | 10/1989 | Matthews et al. | 426/272 |
| 4,915,968 A | 4/1990 | Matthews et al. | 426/513 |
| 4,921,714 A | 5/1990 | Matthews et al. | 426/90 |
| 4,923,705 A | 5/1990 | Mattur et al. | |
| 4,975,309 A | 12/1990 | Gord et ak. | 428/34.8 |
| 4,999,204 A | 3/1991 | Gibson | 426/104 |
| 5,030,078 A | 7/1991 | Matthews et al. | 425/133.1 |
| 5,061,507 A | 10/1991 | Aulik et al. | 426/637 |
| 5,100,680 A | 3/1992 | Matthews et al. | 426/92 |
| 5,100,682 A | 3/1992 | Matthews et al. | 426/282 |
| 5,236,653 A | 8/1993 | Hentschel | |
| 5,439,702 A | 8/1995 | French | |
| 5,492,706 A | 2/1996 | Cockings et al. | |
| 5,637,341 A | 6/1997 | Rivlin | |
| 5,670,185 A | 9/1997 | Ernest Heck et al. | |
| 5,695,805 A | 12/1997 | Borek et al. | |
| 5,738,896 A | 4/1998 | Cassetta et al. | 426/557 |
| 5,780,091 A | 7/1998 | Cassetta et al. | 126/557 |
| D401,385 S | 11/1998 | Mintz | 1/125 |
| 5,874,120 A | 2/1999 | Borek et al. | |
| 5,887,415 A | 3/1999 | Matthews et al. | 53/576 |

METHOD AND APPARATUS FOR MAKING AN HELICAL FOOD PRODUCT

This application is a divisional of application Ser. No. 09/075,284, filed May 8, 1998 (pending).

BACKGROUND OF THE INVENTION

GB-A-2156727 (Pemberton Sintermatic SA) discloses a method for the production of helical protein products in which a proteinaceous product, such as meat or a meat-like product is injected into a cylindrical mould through a nozzle. As extrusion proceeds, the nozzle is withdrawn from the mould to form said helical product. Optionally the mould and nozzle may be rotated relative to one another, but according to GB-A-2156727 this is not necessary provided the rates of extrusion and nozzle withdrawal are correctly adjusted. The wall of the mould is porous and as the product is formed in the nozzle, an acid is applied through the wall onto the outer surfaces of the product, which acid causes coagulation of the proteinaceous product at the surface so as to render the surface cohesive, by which is meant that the product becomes self-supporting, so that thereafter it can retain its shape.

A problem with the method of GB-A-2156727 is that by forming in situ a cohesive skin on the surface of the product by the application of acid or heat, the adjacent turns of the product tend to stick together where they touch to form a generally cylindrical product having a ribbed appearance. Areas of the surface that are inadvertently missed with the acid or heat treatment during manufacture tend to re-anneal during subsequent cooking of the product.

Another disadvantage of the method of GB-A-2156727 is that it does not permit the continuous manufacture of product. Each helical unit has to be made individually within the mould, and removed from the mould before the next unit can be formed. Furthermore, it is difficult to adjust the extrusion and nozzle withdrawal rates suitably to obtain an helical product.

OBJECTS OF THE INVENTION

Accordingly it is an object of the present invention to provide a skinless, helical food product in which the adjacent turns are substantially prevented from re-annealing during manufacture or subsequent cooking.

Another object of the invention is to provide an improved method of manufacturing an helical food product.

A particular, ancillary object of the present invention is to provide a continuous process for manufacturing an helical food product, which process should ideally be easy to set-up and operate with minimum wastage.

Yet another object is to provide an improved apparatus for implementing the method of the invention.

SUMMARY OF THE INVENTION

According one aspect of the present invention therefore there is provided a food product comprising one or more plastic food substrates formed into an helical configuration and coated with a fluid barrier agent to prevent re-annealing of adjacent turns of the product.

By 'helical' is meant a single helix or a multiple helix, e.g. a double or triple helix. Said food product may be formed from a single plastic food substrate as a single or multiple helix. Alternatively a multiple helix food product may be made from a plurality of different food substrates, typically two, three or four such substrates.

The fluid barrier agent acts to prevent bonding of the food substrate(s) in adjacent turns of the helical product during subsequent processing steps, including cooking. Said fluid barrier agent may be a liquid vegetable oil such, for example, as hydrogenated vegetable oil, Soya oil, rape oil, sunflower oil, safflower oil, peanut oil or a mixture of such oils. Alternatively, said fluid barrier agent may comprise an oil and water emulsion. Such an emulsion may comprise approximately equal amounts of oil and water, together with a suitable emulsifying and/or stabilising agent. Said emulsion may be formed by ambient or chilled temperature high shear mixing using Soya protein isolate; milk protein (caesinates) lactose/milk minerals; milk protein with stabilizers, Xanthan gum, Guar gum and/or deheated mustard power; or blood plasma. At higher energies and temperatures, sodium stearoyl lactoylate can be used. Alternatively the emulsion could be prepared using polyglycol alginates. Higher energy systems of emulsification, by application involve the dispersion of an emulsifying agent into a fraction of the liquid oil phase heated above the melting point of the emulsifying agent. The dispersed emulsifier, in oil, is then introduced into the bulk oil and mixed, and finally introduced by high shear into the water phase, neat or with the water optionally pre-stabilised with gums such as Xanthan, Guar or other hydrocolloids such as hydroxypropylmethyl cellulose or modified celluloses, carrageenans, starches, alginates or gelatin.

Said emulsifying agent may be selected from lipophilic mono and di glycerides of fatty acid, or acetic acid, lactic acid, citric acid, tartaric acid esters of glyceride or a blend thereof, e.g. E471, E472 (a), (b), (c), (d), (e), (f). Alternatives include the lecithins.

Said fluid barrier agent may optionally carry one or more additives selected from water or oil soluble seasonings and flavouring components.

The or each plastic food substrate may, for example, be selected from meat, cheese and pastry based doughs. Preferably at least one of the substrates will be meat based. Said meat may be fresh or frozen, finely comminuted or mechanically separated (recovered) meat. Said meat may be animal or poultry meat, and may be lean meat or, preferably, a mixture of lean meat and fat. Such meat-based substrates may comprise 25–100 wt % meat, preferably 50–75 wt %, including fat. For example a meat-based substrate may typically comprise about 70% meat. The meat component itself may comprise 60–80 wt % mechanically separated meat, typically about 70 wt %. Said meat based substrate may further comprise 5–15 wt % ice, typically about 12 wt %, and optionally one or more seasonings and flavourings. By "meat" here is meant physical meat. Said physical meat may have an analytic meat content of 60–80%, typically about 70% wt, with the remainder usually being largely water.

In especially preferred embodiments of the present invention, the or each meat-based substrate further comprises one or more water-retaining agents, which serve to retain water within the product on cooking. It will be appreciated by those skilled in the art that, on cooking, meat loses water, which gives rise to shrinkage and weight loss of the product. By including a water-retaining agent within the meat substrate(s), such water loss is reduced. Moreover, those skilled in the art will further recognise that a helix represents a fairly 'high energy' configuration, and on cooking the product will tend to unwind. Such partial unwinding will result in elongation of the product along the longitudinal axis of the helix. Of course, the extent of such elongation would be offset by shrinkage of the product overall as a result of water loss. However, by controlling water loss in accordance with the present invention, an helical product in accordance with the present invention can be produced which, on cooking, exhibits a net expansion. This is a particularly interesting effect, which appeals especially to children.

In some embodiments, said meat substrate may comprise 5–20 wt % of such a water-retaining agent, preferably 8–15 wt %. Said water-retaining agent may comprise a hydratable, dried or partially dried foodstuff that hydrates under product cooking by absorbing water released from the meat. Especially preferred are granular water-swellable agents, which expand on cooking to assist in overall expansion of the helical product.

Said water-retaining agent will preferably comprise one or more carbohydrates. Carbohydrates are preferred as they may also assist in disrupting the meat protein matrix during cooking. Suitable carbohydrates are rusk and starches, e.g. native starch (tapioca). About 13–14 wt % rusk is especially preferred, although the rusk content can be reduced to around 7–8 wt % provided another water-retaining or swelling agent is employed in addition. As water-retaining agents may also be employed fat emulsions stabilized by protein. Said protein may comprise any globular or linear proteins that are known in the art for stabilizing a fat emulsion, such for example as Soya or milk proteins, e.g. Soya protein isolate or caesinates. The meat substrate may comprise up to one part fat emulsion to four parts meat, typically one to six parts. Said fat emulsion will also provide an alternative fat source to the meat itself.

In some embodiments, said meat substrate may comprise collagen fibre; typically 1–3% wt, e.g. 2% wt. It has been found that at ambient temperature up to about 58° C. collagen fibre holds water and thus may act as a water retaining agent. On cooking, collagen fibre forms a weak gel or liquid form of gelatin. This relaxing of the structure of the collagen fibre has been found to promote extension of the product as described above. Collagen fibre also assists in preparing a meat substrate that is suitable for extrusion. In some embodiments of the invention collagen fibre may be used in conjunction with carbohydrate (e.g. rusk) as a water-retaining agent.

According to another aspect of the present invention, there is provided a method for making an helical food product in accordance with the present invention, which method comprises extruding one or more plastic food substrates through a nozzle into a hollow shaping part whilst causing or allowing relative rotation of the nozzle and shaping part, thereby to form a product of helical configuration, and applying a fluid barrier agent to the outer surface of the product as it is dispensed from the nozzle into the shaping part, which barrier agent is adapted to prevent re-annealing of adjacent turns of the helical product.

Where two or more food substrates are co-extruded, such substrates may be extruded through juxtaposed dispense passageways in said nozzle.

According to the method of the present invention, the helical product may be collected from the shaping part, treated to make the surface of the product sufficiently rigid for cutting, and then cut to convenient lengths. The crust hardening may be achieved by heat-setting, e.g. by flash-frying, or crust freezing. Conveniently, crust freezing may be effected by passing the product through a cryogenic tunnel to achieve an internal product temperature in the range −3 to −5° C., typically about −4° C. The product may be dusted with seasoning and/or seasoning elements and frozen. The product will usually be sold and cooked by the consumer from frozen.

According to another aspect of the present invention there is provided an apparatus for making an helical food product in accordance with the present invention, which apparatus comprises a nozzle for extruding one or more plastic food substrates; a hollow shaping part that is arranged to receive the substrate(s) from the nozzle, said shaping part having an open end downstream of the nozzle; rotating means for causing or allowing relative rotation of the nozzle and shaping part so as to form the substrate(s) into a product of helical configuration; and dispensing means for dispensing a fluid barrier agent onto the outer surface of the helical product as it debouches the nozzle, which fluid barrier agent is adapted to prevent re-annealing of adjacent turns of the helical product; the arrangement being such that in use said helical product is formed within the shaping part, is coated with said fluid barrier agent and is dispensed continuously from the apparatus via the open end of the shaping part.

Conveniently, said nozzle may be journalled for rotation within the hollow shaping part. Said shaping part may define a generally cylindrical conduit that accommodates the outlet end of the nozzle, which conduit extends downstream of the nozzle. Said shaping part may comprise a ring that encircles the outlet end of the rotary nozzle.

Preferably, the nozzle and shaping part define an annular space therebetween, which annular space is open at its downstream end, and said fluid dispensing means is arranged to introduce the fluid barrier agent into said annular space, such that in use the barrier agent is delivered from the annular space via the open downstream end thereof onto the helical product as the product debouches the nozzle. Said fluid dispensing means may comprise a port formed in the shaping part, which port is adapted for connection to a pumped supply of said fluid agent.

Typically said nozzle may comprise an elongate, generally cylindrical component that is adapted for rotation about its longitudinal axis, having a chuck at one end for connection to a rotating means such, for example, as the output of a motor.

In some embodiments, the nozzle may comprise a single dispensing passageway for dispensing a plastic meat-based substrate into the shaping part. Said dispense passageway may be configured such that the substrate is directed outwardly at an angle to the axis of rotation as it debouches into the shaping part, so as to assist in forming the substrate into an helical configuration. The cylindrical component may thus be provided with a longitudinal axial bore, which bore has an inlet at one end for connection to a pumped supply of said food substrate, and an outlet at the other for debauching the substrate interiorly of the shaping part. The axial bore may be deflected away from the longitudinal axis towards the outlet end, so as to direct the debauching meat substrate towards the inner surface of the shaping part. The end face of the component, in which end face the outlet is formed, may be skewed with respect to said longitudinal axis. Said end face may subtend an angle of 15 to 75°, preferably 30 to 60°, with the plane of an orthogonal section through said axis. Said end face may be substantially planar, so as to assist in propelling the dispensed meat-based substrate downstream within the shaping part.

Alternatively, in some embodiments, said nozzle may be equipped with two or more dispense passageways that are arranged juxtaposed one another. Each dispense passageway may have an inlet for connection to a respective pumped supply of a plastic food substrate and an outlet for debauching the food substrate into the shaping part. Each of said outlets may be offset from the axis of rotation of the nozzle to assist in forming the substrates into a multiple helix. Said outlets may be of the same diameter as each other or they may have different diameters depending on the desired characteristics of the product. The cylindrical component may thus be provided with a plurality of substantially parallel, longitudinal, non-axial bores to provide the dispense passageways, which bores are open at each end to provide the respective inlets and outlets.

In a particularly preferred aspect of the present invention, the apparatus in accordance with the invention may have a modular construction comprising a plurality of components which can be assembled in different ways to allow co-extrusion of different numbers of plastic food substrates as required. Said apparatus may thus comprise a first base-block component, one or more second intermediate components, a third outlet component and a plurality of nozzle components; wherein said first and third components can be assembled, optionally with one or more of the second components interposed therebetween, to define a continuous, substantially cylindrical cavity, which cavity is adapted to receive one of said nozzle components for rotation therein; wherein each of said nozzle components has an upstream end, a downstream end and a plurality of longitudinally extending open bores, each of which bores has an outlet at the downstream end of the nozzle component and an inlet, the inlets of the bores being longitudinally spaced from one another; wherein each of said second intermediate components and said nozzle component are shaped to define an annular recess around a respective inlet on the nozzle component when fitted, and each second component comprises a supply means adapted to supply a respective food substrate to said annular recess; wherein said third component and said nozzle component are shaped to define an annular space therebetween, which space is open at its downstream end, and means are provided for supplying a fluid barrier agent to the space; wherein the third component extends downstream of the nozzle component when fitted to form a shaping part; and wherein the first base-block component is adapted to receive an output of a rotating means which can be coupled to the upstream end of a nozzle component when fitted for causing rotation of the nozzle component within the cavity; the arrangement being such that the first and third components can be assembled with one or more of the second intermediate components, and a nozzle component with a corresponding number of bores received within the cavity thus formed, for extruding the corresponding number of plastic food substrates to form an helical product having the corresponding number of helices.

In some embodiments one or both of the first and third components may also be equipped with a supply means for supplying a respective plastic food substrate to a respective one of the bores within the nozzle component.

The nozzle components will normally have different numbers of bores, typically two, three, four, five, etc, When it is desired to extrude a product having a given number of helices within a multiple helix, e.g. a double or triple helix, then the apparatus is assembled using the appropriate number of second intermediate components and a nozzle component having said given number of bores is used.

The present invention thus provides a novel helical meat product that substantially retains its helical configuration through manufacture, sale and cooking, by the application of a fluid barrier agent to the outer surface of the product during its manufacture. Said fluid is usually an oil or an oil/water emulsion and may act by weakening protein bonds formed during solubilisation or mixing of the meat comminutes, thus avoiding weak bonding during subsequent cooking or protein denaturation steps.

Detailed Description of the Invention
Examples 1 to 4
Four product mixes were prepared to the following recipes:

| Recipe | Example 1 | Example 2 | Example 3 | Example 4 |
|---|---|---|---|---|
|  |  |  |  | Frozen |
| 25.75 Fresh MST[1] 25.75 | 51.5 | — | 51.5 | Fresh |
| Port Fat | 16.5 | — | 16.5 | 10.00 |
| Rusk | 13.5 | — | 8.0 | 8.00 |
| Ice | 12.5 | 9.24 | 16.0 | 12.70 |
| Pork Belly | 3.5 | — | 3.5 | 3.50 |
| Seasoning | 2.5 | — | 2.5 | 2.50 |
| Collagen Fibre | — | — | 2.0 | — |
| Whey Protein Concentrate | — | — | — | 1.00 |
| Soya Protein Isolate | — | — | — | 0.80 |
| Water | — | — | — | 4.00 |
| Palm Oil | — | 5.80 | — | 4.00 |
| Calcium Carbonate | — | — | — | 2.00 |
| Rehydrated TVP[2] 2:1 dry | — | 19.81 | — | — |
| Tapioca Starch | — | 4.00 | — | — |
| Chicken Flavouring | — | 0.96 | — | — |
| Salt | — | 0.97 | — | — |
| Herb Extract | — | 0.02 | — | — |
| GW Pepper | — | 0.05 | — | — |
| Sodium Caseinate | — | 1.63 | — | — |
| Skimmed Milk Powder | — | 2.00 | — | — |
| Skin | — | 10.00 | — | — |
| Red Trims | — | 10.00 | — | — |
| Oyster Meat | — | 20.52 | — | — |
| Baardered White Trims | — | 15.00 | — | — |
|  | 100.00% | 100.00% | 100.00% | 100.00% |
| Post Mix Temperature | +4° | +4° | +7° C. | +5.6° C. |

[1]MST = Mechanically separated turkey
[2]TVP = Textured vegetable protein

Figure 1:
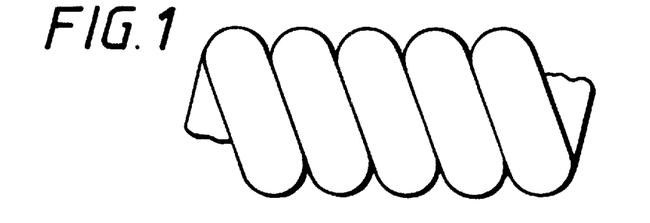
FIG. 1 is a side view of an helical food product in accordance with the present invention.

Each of the above product mixes was formed into skinless, helical products as shown in FIG. 1 having an extruded diameter of about 10 mm and an outer coil diameter of about 25 mm and coated with a fluid barrier agent using apparatus of the kind that is described below. As fluid barrier agents were used liquid vegetable oil, water and a 50/50 oil/water (Soya) emulsion. By way of comparison, a helical food product was made from the Example 1 product mix which was coated with a 5% lactic acid solution. The helical products were crust frozen, dusted with a standard barbecue glaze and cut into approximately 50 g sections having a target length of 11.1 cm. The products were then cooked by grilling, baking or shallow frying. The length of each product was measured before and after cooking. The results were as set out in following Table 1.

TABLE 1

| Cook Method | on g length cm | Final length cm | Cook loss | % Increase Addn in length | Product Wt (g) | Final Wt (g) |
|---|---|---|---|---|---|---|
| Recipe Example 1 | | | | | | |
| Lubricant: Oil (n = 3) | | | | | | |
| Grill | 11.3 ± 0.6 | 14.8 ± 0.3 | 23.6 ± 8.6 | 30.9 | 29.7 ± 2.7 | 22.6 ± 2.3 |
| Oven | 11.7 ± 0.3 | 13.5 ± 0 | 22.5 ± 2.0 | 15.4 | 29.9 ± 2.2 | 23.4 ± 2.2 |
| Stir fry | 11.5 ± 0.6 | 15.5 ± 0.6 | 18.6 ± 3.3 | 34.5 | 29.8 ± 1.7 | 24.2 ± 2 |
| Ave | | | | 26.7% | | |
| Lubricant: Water (n = 5) | | | | | | |
| Grill | 11.5 ± 0.3 | 13.1 ± 0.2 | 16.5 ± 2 | 13.4 | 46.8 ± 2.3 | 39.1 ± 2 |
| Oven | 11.2 ± 0.3 | 12.2 ± 0.3 | 15.6 ± 2.0 | 8.9 | 47.7 ± 5.2 | 40.2 ± 4.5 |
| Stir fry | 11.3 ± 0.5 | 13.02 ± 0.4 | 15.5 ± 1.0 | 15.0 | 50.66 ± 3.5 | 43.4 |
| Ave | | | | 12.7% | | |
| Lubricant: Oil - Tight Coil | | | | | | |
| Grill (n = 4) | 11.5 ± 0.4 | 14.25 ± 0.3 | 18.6 ± 2.0 | 23.9 | 52.0 ± 2.6 | 42.2 ± 1.6 |
| Oven (n = 3) | 12.1 ± 0.3 | 13.5 ± 0.5 | 16.6 ± 1.8 | 11.6 | 54.2 ± 2.3 | 45.1 ± 1.0 |
| Stir fry (n = 3) | 11.5 ± 0 | 14.2 ± 1.2 | 25.2 ± 8.4 | 23.5 | 51.4 ± 2.3 | 43.1 ± 3.3 |
| Ave | | | | 19.5% | | |
| Lubricant: Oil ($n^1$ = 5) | | | | | | |
| Grill | 11.6 ± 0.45 | 15.1 ± 0.7 | 22.7 ± 0.8 | 30.2 | 47.0 ± 1 | 36.4 ± 1 |
| Oven | 11.3 ± 0.6 | 13.3 ± 0.6 | 21.3 ± 2.5 | 17.7 | 46.5 ± 1.5 | 36.6 ± 1.4 |
| Stir fry | 11.4 ± 0.2 | 14.8 ± 0.9 | 21.5 ± 2.2 | 29.8 | 47.0 ± 1.5 | 36.9 ± 1 |
| Ave | | | | 25.9 | | |
| Lubricant: 1% Soya 50:50 Oil/Water (n = 5) | | | | | | |
| Grill | 11.8 ± 0.6 | 14.3 ± 0.9 | 20.2 ± 2.5 | 21.2 | 43.6 ± 3 | 34.7 ± 1.4 |
| Oven | 11.5 ± 0.9 | 13.8 ± 1.1 | 14.7 ± 3.0 | 20.0 | 45.3 ± 7 | 38.5 ± 5.8 |
| Stir fry | 11.3 ± 0.3 | 15.3 ± 1.2 | 19.3 ± 1.3 | 35.6 | 44.9 ± 7.5 | 36.1 ± 5.5 |
| Ave | | | | 25.4% | | |
| Comparative Example | | | | | | |
| Lubricant: 5% Lactic Acid Solution (n = 5) | | | | | | |
| Grill | 11.6 ± 0.22 | 12.4 ± 0.65 | 14.6 ± 1.3 | 6.9 | 45.1 ± 1.1 | 38.5 ± 1.4 |
| Oven | 11.3 ± 0.5 | 12.4 ± 0.6 | 12.8 ± 2.8 | 9.7 | 44 ± 3.0 | 38.7 ± 3 |
| Stir fry | 11.4 ± 0.2 | 13.4 ± 0.9 | 17.3 ± 1.3 | 17.54 | 46.6 ± 1.1 | 38.4 ± 1.0 |
| Ave | | | | 11.4% | | |
| Recipe Example 2 | | | | | | |
| Lubricant: Oil (n = 5) | | | | | | |
| Grill | 11.6 ± 0.5 | 12.8 ± 1 | 17.5 ± 5.3 | 10.3% | 48.9 ± 3 | 40.0 ± 3.7 g |
| Oven | 12.0 ± 0.3 | 12.9 ± 0.7 | 13.0 ± 3.0 | 7.5% | 46.6 ± 3 | 41.8 ± 2.5 g |
| Stir fry | | | 21.4 ± 3.6% | | | |
| Ave | | | | 8.8% | | |
| Lubricant: Water (n = 5) | | | | | | |
| Grill | 10.9 ± 0.6 | 12.0 ± 0.3 | 11.64 ± 2.7 | 10.1% | 49.2 ± 1.7 | 43.5 ± 2.2 |
| Oven | 11.3 ± 0.4 | 11.7 ± 0.4 | 16.7 ± 2.1 | 3.5% | 50.4 ± 1.3 | 42 ± 1.7 |
| Stir fry | | | 15.9 ± 5.3 | | | |
| Ave | | | | 6.8% | | |
| Recipe Example 3 - Reduced Rusk Collagen Sausage | | | | | | |
| Lubricant: Oil (n = 5) | | | | | | |
| Grill | 11.10 ± 0.5 | 13 ± 0.8 | 14.7 ± 0.9 | 17.1 | 49.8 ± 2.3 | 42.4 ± 2.1 |
| Oven | 11.4 ± 0.5 | 13.4 ± 0.7 | 14.8 ± 1.1 | 17.5 | 49.9 ± 1.0 | 42.5 ± 0.6 |
| Stir fry | 11.0 ± 0 | 14.0 ± 0.8 | 14.0 ± 1.8 | 27.5 | 48.7 ± 0.8 | 45.7 ± 3.6 |
| Ave | | | | 20.6% | | |

TABLE 1-continued

| Cook Method | on g length cm | Final length cm | Cook loss | % Increase Addn in length | Product Wt (g) | Final Wt (g) |
|---|---|---|---|---|---|---|
| Recipe Example 4 - Reduced Rusk/Starch/Palmoil Soya Emulsion/Carbonate | | | | | | |
| Lubricant: Oil (n = 5) | | | | | | |
| Grill | 11.1 ± 0.5 | 13.6 ± 0.6 | 20.1 ± 1.6 | 22.25 | 42.1 ± 3.2 | 33.6 |
| Oven | 11.1 ± 0.5 | 13.5 ± 0.8 | 16.4 ± 1.9 | 21.6 | 41.0 ± 3.9 | 34.5 ± 4.0 |
| Stir fry | 10.9 ± 0.2 | 13.9 ± 0.8 | 19.3 ± 1.8 | 27.5 | 38.7 ± 2.2 | 31.2 ± 2.3 |

As can be seen from the foregoing results, the product mixes of Examples 1 and 4 gave the best results, with average percent increases in product length cooking of 25.9% and 23.8% respectively using vegetable oil as the lubricant. With a loose coil, the average expansion of the mix of Example 1 increased to 26%, whilst with a tight coil, the average expansion of the Example 1 mix decreased to 19.5%. The mix of Example 2 performed the worst, and it is thought that the highly "functional" protein ingredients of that mix tended to result in cohesion of adjacent turns of the helical coil. In Example 3, the rusk component was reduced to 8% (as compared with 13.5% in Example 1), and this reduction in carbohydrate content was compensated by including an additional 2.0% collagen fibre. As can be seen, the average expansion of the product of Example 3 on cooking was 20.6%, although the reduction in rusk impaired the organoleptic quality of the product in that texturally it was too soft.

In Example 4, the rusk content was also reduced to 8%, and this reduction in water binding material was compensated for by incorporating a stable vegetable fat emulsion having a total content in the mix of 11.8%. The results for Example 4 illustrate that a protein-stabilized fat emulsion can be used to retain water within the product on cooking by encapsulating the water in the product matrix.

The best results were obtained by using the product mix of Example 1 with a loose coil and vegetable oil as the fluid barrier agent.

Figure 3:
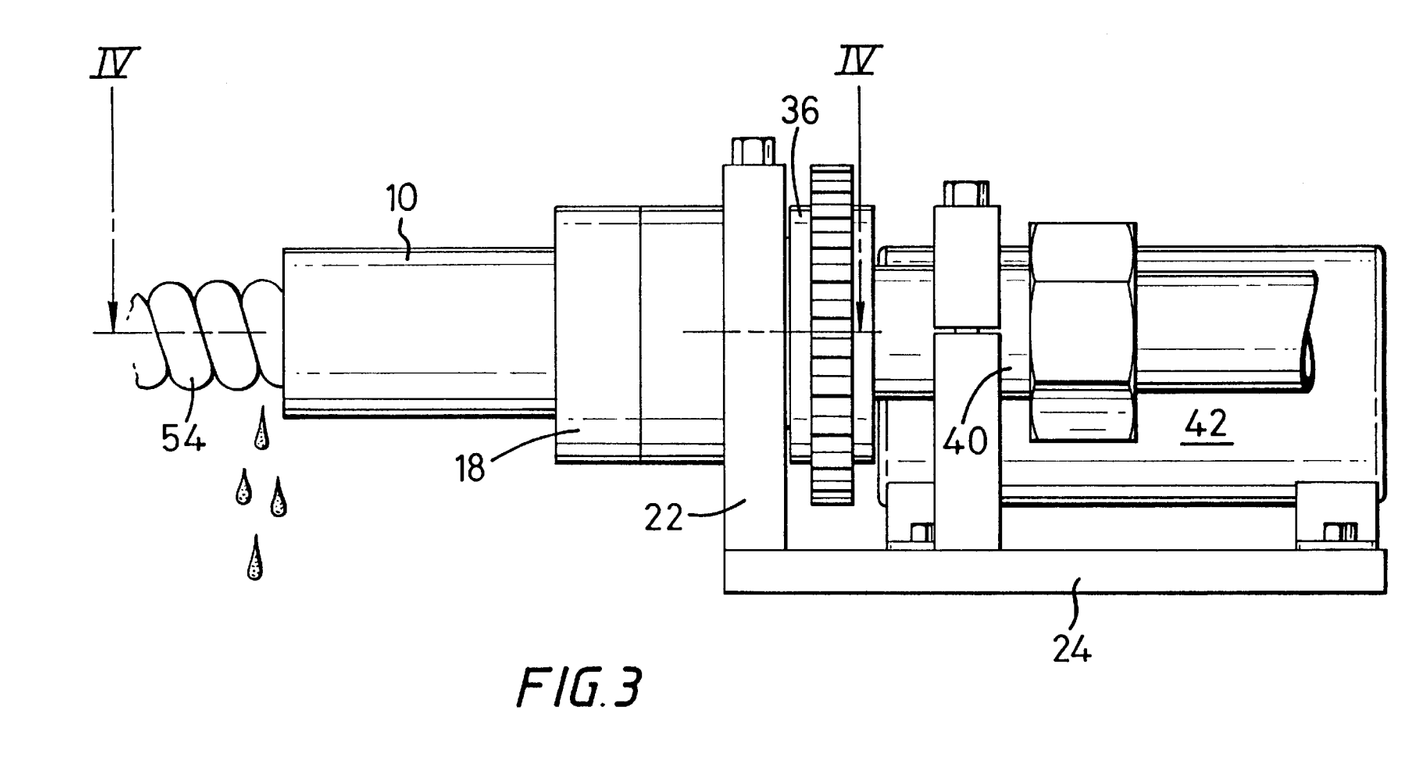
FIG. 3 is a side elevation of an apparatus in accordance with the present invention for making an helical food product.
Figure 4:
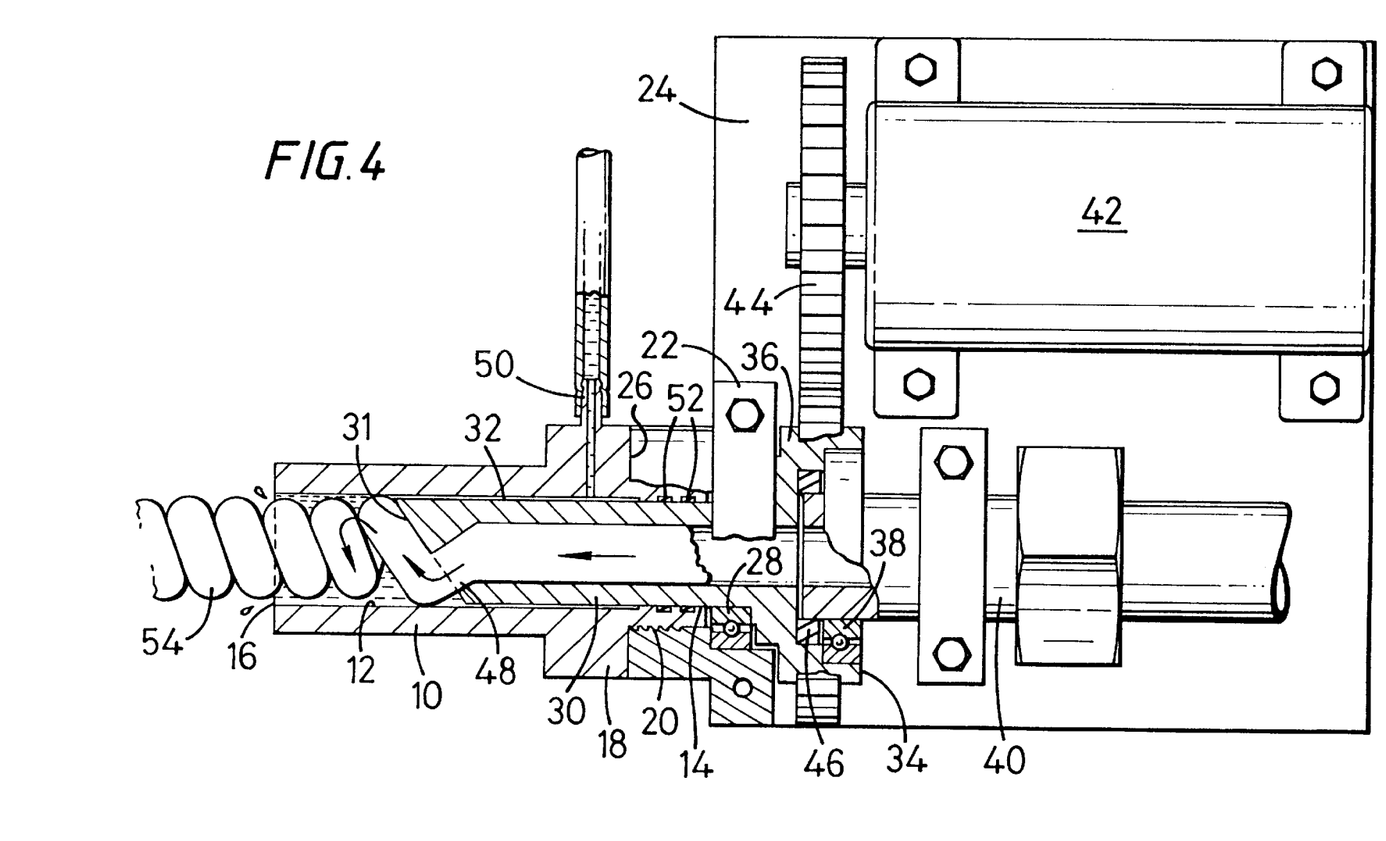
FIG. 4 is a plan view of the apparatus of FIG. 3, partly in cross-section on the line IV—IV as shown in FIG. 3.

The helical products were made from the product mixes of Examples 1 to 4 using apparatus illustrated in FIGS. 3 and 4. Of course, the apparatus of the present invention is not limited to the use of the particular product mixes of Examples 1 to 4, and the apparatus may be used with any suitable extrudable food substrate known to those skilled in the art.

The extrusion apparatus shown in accompanying FIGS. 3 and 4 comprises a first, fixed shaping tube (10) that defines a substantially cylindrical bore (12) having an upstream end (14) and a downstream end (16). Said bore has an internal diameter of about 25 mm. Towards the upstream end (14), said first tube (10) comprises an exterior, ring-like flange portion (18) and an externally threaded portion (20) that mates with an internal thread in a bore of a fixing bracket (22). Said fixing bracket (22) is mounted securely on a base plate (24), and the upstream end (14) of the fixed shaping tube is screwed into the bore of the fixing bracket, until the flange portion (18) of the fixed tube abuts on the bracket at (26) to provide a firm attachment.

Said fixing bracket (22) further accommodates a first rotary bearing (28) that carries a rotary inner tube (30).

Said inner tube (30) comprises a substantially cylindrical portion (32) that is accommodated within the bore of the fixed tube (10). At its upstream end (34), said inner tube (30) comprises an integral disc portion (36) that is rebated, and accommodates a second rotary bearing (38). Said second bearing (38) carries a downstream end of a short connecting tube (40), the upstream end of which can be connected to a pumped supply of a plastic food substrate, such, for example, as one of the product mixes of Examples 1 to 4 above.

The outer surface of the disc portion (36) is coupled to a motor (42) via a suitable transmission mechanism (44) such, for example, as a gear wheel or chain/sprocket. Food substrate entering the connecting tube (40), thus enters the upstream of the inner tube (30), and an annular seal (46) is provided between the inner tube (30) and the connecting tube, for preventing any leakage of food substrate from the upstream end of the inner tube. Said plastic food substrate then flows downstream interiorly of the inner tube (30), which terminates in a planar end face (31) intermediate the downstream end (16) of the outer tube (10) (see FIG. 4). The wall of the inner tube (30) is shaped towards its downstream end so as to form an outlet portion (48) of the bore of the inner tube (30), which outlet portion has an internal diameter of about 10 mm and is deflected radially outwardly of the central, longitudinal axis of the cylindrical portion (32), so that as the food substrate debouches the inner tube (30), it is directed by the outlet portion (48) towards the inner surface of the outer tube (10). Said planar end face (31) is skewed with respect to the longitudinal axis of the inner tube, such that the face subtends an angle of about 45° to an orthogonal section through the bore.

In operation, said motor (42) is operated to cause rotation of the inner tube (30) about its central, longitudinal axis within the outer tube (10), and it will be seen therefore that the food substrate is dispensed from the inner tube (30) on a circular locus, and the inner surface of the outer tube (10) forms the substrate into an helical configuration. Said skewed end face (31) assists in pitching the extrusion along the wall of the outer tube (10).

Said helical extrudate is assisted in retaining its shape by means of a fluid barrier agent that is introduced between the inner and outer tubes (10, 30) through a port (50) formed radially in the flange portion (18) of the outer tube. Labyrinthine seals (52) are provided to prevent leakage of the fluid from the upstream end (14) of the outer tube, and a small clearance is allowed between the inner and outer tubes, so that the fluid flows downstream to contact the product as it debouches the inner tube. The fluid used will vary from application to application, but it may also act as a lubricant between the rotary inner tube (30), and the outer tube.

In some embodiments, the fluid may be selected from potable water, a water-in-oil or oil-in-water emulsion or liquid vegetable oil. Any edible vegetable that is known by those skilled in the art to be suitable for use in cooking may be use. As examples may be cited hydrogenated vegetable oils, Soya oil, rape oil, sunflower oil, safflower oil, peanut oil or a mixture of such oils. Where an oil/water emulsion is employed, said emulsion may comprise approximately equal parts of vegetable oil and potable water, together with a suitable emulsifier and/or stabilizing agent. Said fluid may further comprise liquid or solid additives such, for example, as water or oil-soluble seasonings and flavourings.

Some of the fluid will adhere to and form a coating on the external surface of the helical product (54) as discussed above, but a substantial quantity of the fluid will drip from the product as it exits the downstream end (16) of the outer tube (10) (see FIG. 3). Means may be provided for catching the excess fluid and, optionally, for recycling and re-using it.

Downstream of the outer tube (10), the helical product is removed by conventional conveying means for cutting into saleable lengths. Before cutting, the product is cryogenically cooled to the point of stiffness or heat-set (e.g. by flash frying). The product may be dusted before or after cutting with an optional powdered or ground seasoning or flavouring agent and re-frozen. The product is intended to be sold frozen and also cooked from frozen. The best modes of cooking are shallow frying and grilling, but the product may also be oven baked satisfactory. On cooking, the helical products in accordance with the present invention are seen to expand and unwind.

Figure 2:
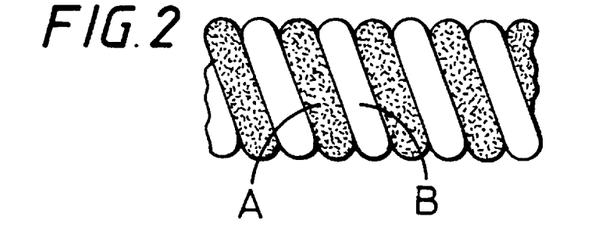
FIG. 2 is a side view of another helical food product in accordance with the present invention.

As mentioned above, it is also possible in accordance with the present invention to form extrudable plastic food substrates into multiple helices such, for example, as the double helix illustrated in FIG. 2. This double helix product is formed from two different food substrates, indicated as A and B. For the purposes of clarity, the food substrates A and B are shown respectively as shaded and unshaded. In practice, it will be appreciated that the different food substrates forming the multiple helixes may have the same or different appearances. In some embodiments, a helical food product in accordance with the present invention comprising a multiple helix may be made from two or more strands of the same product mix, in which case the two helices forming the double helix will naturally have substantially the same colour and texture. Where different product mixes are used for the component helices of the multiple helix product however, the different strands may have different colours and/or textures, particularly where different kinds of meat are used in the different mixes. Whilst it is preferred that at least one of the food substrates used in the multiple helix products is a meat based product, the other strands of the multiple helix may be formed from non-meat based substrates such, for example, as cheese or pastry dough substrates. For instance, it is envisaged that a double helical product in accordance with the present invention may comprise one strand of a meat based substrate, and the other strand of a pastry substrate, so as to form a novel kind of sausage roll product. The visual appearance of a helical product comprising a multiple helix in accordance with the present invention may be enhanced by including food colourings in one or more of the mixes forming the individual strands.

Figures 5, 5A:
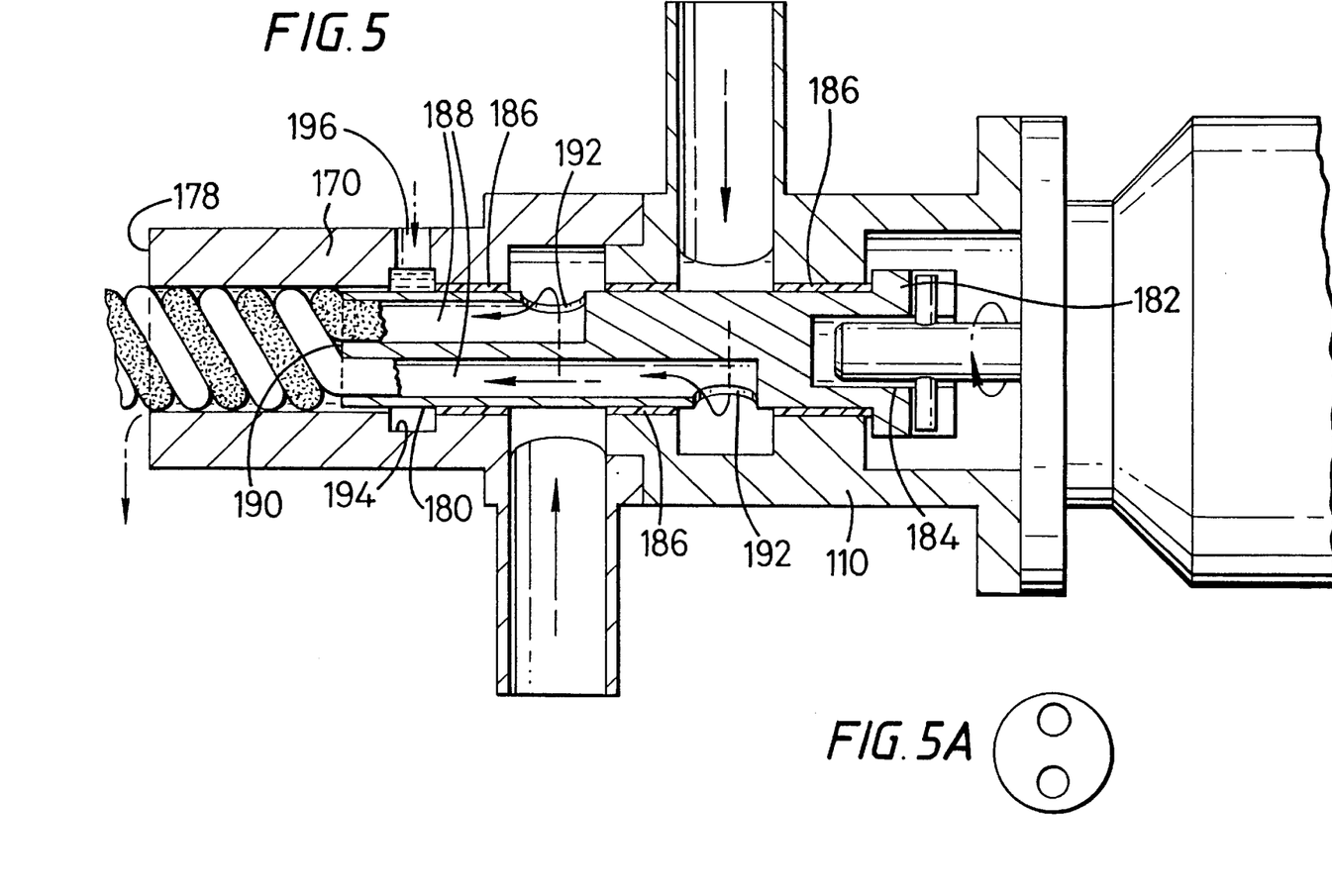
FIG. 5 is a side view, partly in cross-section, of another apparatus in accordance with the present invention.
FIG. 5A is an end view of the nozzle component of the apparatus of FIG. 5.
Figure 6:
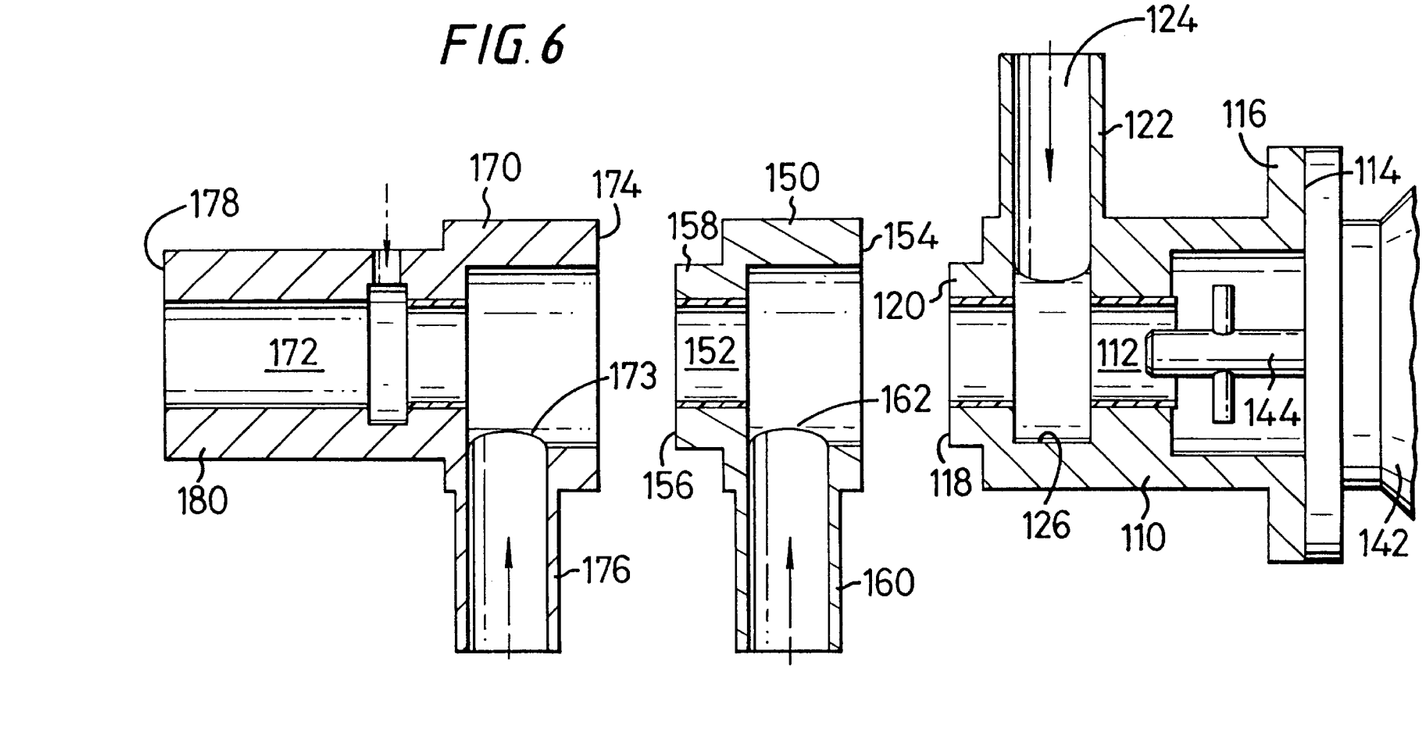
FIG. 6 is a cross-sectional view of various components of the apparatus of FIG. 5, shown disassembled.

A helical product having a multiple helix configuration can be made using apparatus of the kind shown in FIGS. 5 and 6 in accordance with the present invention. Said apparatus has a modular construction, comprising a plurality of components which can be assembled in different ways to make apparatus suitable for making multiple helices having different numbers of constituent helices. With reference firstly to FIG. 6, the assembly comprises a base block component (110) of generally cylindrical configuration, having an axial bore (112). Said base block component (110) is rebated at an upstream end (114) to accommodate an output shaft (144) of an electric motor (142), such that the output shaft (144) is disposed coaxially of the bore (112). Conveniently, the base block (110) is provided with an upstream, integral flange (116) for fixing the base block component (110) to the motor housing.

Said base block component (110) is machined at its downstream end (118) to provide an axially protruding neck portion (120). The base block component is also equipped with a radially protruding side arm (122) which is drilled through to provide a conduit (124) that communicates with the bore (112) within the base block component (110). Where the conduit (124) is let through the wall of the base block component (110), said wall is provided with an annular groove (126) circumferentially around the bore (112).

The assembly of FIG. 6 further comprises a plurality of intermediate components (150). Only one such intermediate component (150) is shown in FIG. 6. Each intermediate component (150) is generally cylindrical in configuration and is drilled to provide an axial bore (152). Said bore is rebated at an upstream end of (154) of the intermediate component (150), and said intermediate component (150) is machined at a downstream end (156) to provide a protruding, axial neck portion (158) having the same dimensions as the neck portion (120) of the base block component (110). The rebated part of the bore (152) of the intermediate component (150) is dimensioned to accommodate snugly the neck portion (120) of the base block component (110) or the neck portion (158) of another intermediate component (150).

Adjacent the rebated part of the bore (152), the intermediate component (150) is equipped with a hollow side arm (160) that is similar to the side arm (122) on the base block component (110) and communicates with the bore (152). It will be seen from FIG. 6 that the length of the rebated part of the bore (152) in the axial direction is slightly longer than the length of the neck portion (120) on the base block component (110) or the neck portion (158) on the intermediate component (158), so that when assembled, the neck portion (120, 158) defines with the intermediate component (150) an internal annular groove (162) which communicates with the conduit within the side arm (160).

Said assembly further comprises an outlet component (170) again of generally cylindrical configuration. Said outlet component (170) is provided with an axially extending bore (172) which is rebated at an upstream end (174) to accommodate snugly the neck portion (120) of the base block component (110) or the neck portion (158) of an intermediate component (150). Adjacent the rebated part of the bore (172), the outlet component (170) is fitted with a radially extending side arm (176) of the same kind as provided on the intermediate and base block components (110,150). As with the intermediate component (150), it will be seen that the length of the rebated part of the bore (170) within the outlet component (170) is longer than the length of the neck portions (120,158) on the base block and intermediate components (110,150), so that when assembled, the neck portion (120,158) defines a circumferential annular groove within the rebated part of the bore (172) which communicates with the conduit within the side arm (176).

At an upstream end (178), opposing the downstream end (174), the outlet component (170) is provided with a longitudinally extending cylindrical tube portion (180).

The base block component (110) can be assembled with the outlet component (170), optionally with one or more of the intermediate components (150) as shown in FIG. 6 to provide a continuous, linear bore within the assembly which is defined by the bores (112,152,172) within the components. The continuous bore is adapted to receive a nozzle component (180) as shown in FIG. 5. Said nozzle component (180) is substantially cylindrical, such that it can rotate within the continuous bore defined by the assembled components. At an upstream end (182), the nozzle component (180) is provided with a chuck (184), enabling the nozzle component (180) to be connected to the output shaft (144) of the motor (142). The inner surfaces of the base block, intermediate and outlet components (110,150,170) are provided with suitable fluid-type rotary bearings (186) for journalling the nozzle component (180) within the assembly.

As can be seen from FIG. 5, the assembly of FIG. 5 comprises only the outlet component (170) and the base block component (110). The nozzle component (180) is provided with two substantially parallel, longitudinally extending bores (188). Each of said bores (188) is open at a downstream end (190) of the nozzle component (180) to provide an outlet. The other end of each bore (188) is also open to provide an inlet in the side of the nozzle component (180). The inlets (192) of the bores (188) are longitudinally spaced from one another along the axis of the nozzle component (180) and, in the fitted position, each of the inlets (192) is disposed within one of the circumferential grooves (126,173) adjacent a side arm (122,176). Each of the side arms (122,176) can be connected to a respective pumped supply of a plastics food substrate and, in use, the food substrates will thus be supplied to the annular grooves (126,173) around the continuous bore through the assembly and from there into the inlets of the bores (188) through the nozzle component (180).

Figure 7A:
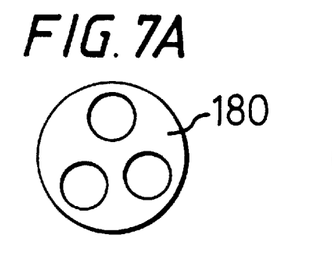
FIGS. 7A–7E show the configurations of various different nozzle components for use in the apparatus of FIGS. 5 and 6.
Figure 7B:
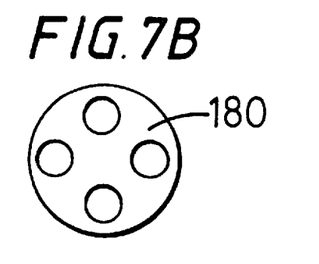
Figure 7C:
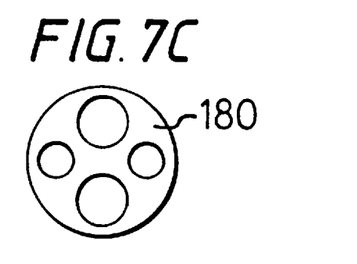
Figure 7D:
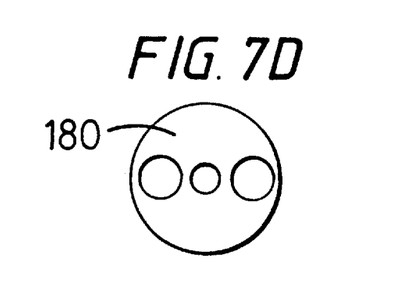
Figure 7E:
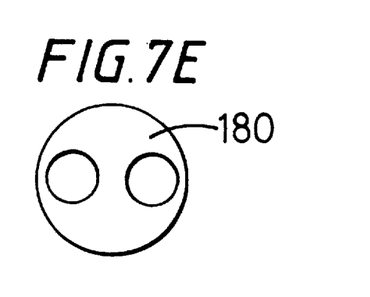

Typically, the assembly of the invention will comprise a plurality of different nozzle components, each comprising a different number of internal bores (188). The end views of a representative number of different such nozzle components (180) are shown in FIGS. 7A to 7E. It will be seen that the nozzle (180) of FIG. 7A comprises three internal bores (188), the axes of which bores (188) are arranged, in end view, at the apices of an isosceles triangle. FIGS. 7B and 7C show two different ways of arranging four parallel bores (188) for extruding a quadruple helix. FIG. 7D shows another arrangement of a triple extrusion nozzle (180). In this case, a double helix will be coextruded around the central, substantially linear core. FIG. 7E shows a nozzle suitable for extruding a double helix.

The food substrates are delivered from the bores (188) at the downstream end (190) of the nozzle component (180) into the cylindrical tube portion (180) of the outlet component (170). The tube portion (180) helps the multiple helix to retain its shape before it is dispensed through the downstream end (178) of the outlet component (170).

The outlet component (170) and nozzle component (180) define an annular recess (192) therebetween juxtaposed the downstream end (190) of the nozzle component (180). Said annular recess (192) communicates with an annular groove (194) formed in the inner wall of the bore (172) extending through the outlet component (170), which annular groove (194) communicates with an inlet port (196) which extends through the wall of the outlet component (170). Said port (196) can be connected to a pumped supply of a fluid barrier agent of the kind mentioned above such, for example, as vegetable oil. In use, said fluid barrier agent will be dispensed from the annular recess (192) onto the product as it is coextruded through the outlets of the bores (188) within the nozzle, to provide a coating of fluid around the adjacent turns of the multiple helix. As mentioned above, this coating will help to prevent reannealing of the substrates forming the helices.

In contradistinction to the apparatus shown in FIGS. 3 and 4 for extruding a helical food product having a single helix, it will be seen that the downstream end of the nozzle component (180) of the apparatus of FIGS. 5 and 6 is planar and is disposed orthogonally to the axis of the assembly. The outlets of the bores (188) within the nozzle component (180) are offset from the central axis of the nozzle component (180), about which the nozzle component rotates, so that when the food substrates are dispensed through the outlets of the bores (188), they are formed into a multiple helix as the nozzle component rotates. As in the case of the nozzle component illustrated in FIG. 7D, any bore which is disposed along the central axis of rotation of the nozzle component (180) will produce a substantially linear strand of food substrate that is enveloped within a single or multiple helix, depending on the number of additional bores that are provided within the nozzle component.

It will be seen that after use, the apparatus shown in FIGS. 5 and 6 can be disassembled for cleaning. The apparatus can then be reassembled in the same way or differently using a different nozzle component and/or different numbers of intermediate components (150) for extrusion of a different product.

What is claimed is:

1. A method for making a helical food product comprising the steps of:

(a) extruding one or more plastic food substrates through a nozzle into a hollow shaping part;

(b) causing relative rotation of the nozzle and the shaping part, thereby forming a product of helical configuration; and (c) applying a fluid barrier agent to the outer surface of the product as it is dispensed from the nozzle into the shaping part, which barrier agent is adapted to prevent reannealing of adjacent turns of the helical product.

2. A method as claimed in claim 1 wherein two or more food substrates are coextruded, said extruding step comprising extruding the substrates through juxtaposed dispensing passageways in the nozzle.

* * * * *